W. HUMPHREYS.
Buggy-Spring.
No. 70,219. Patented Oct. 29, 1867.
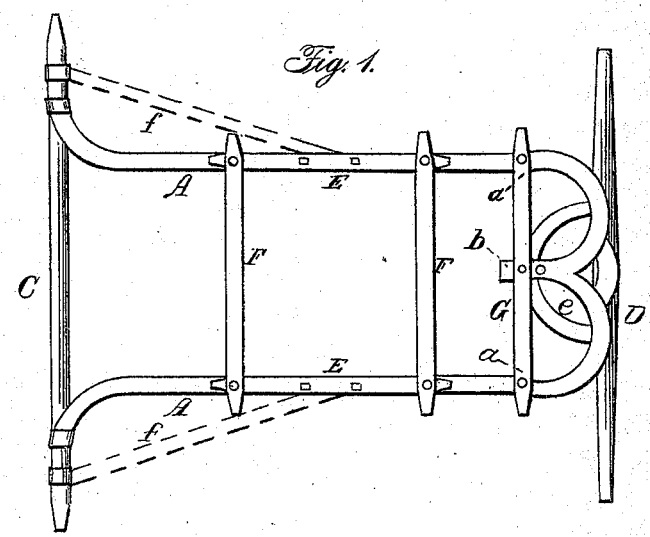
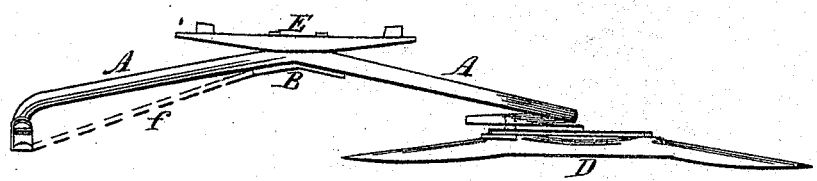
Witnesses:
Inventor:

United States Patent Office.

WILLIAM HUMPHREYS, OF BROOKLYN, NEW YORK.

Letters Patent No. 70,219, dated October 29, 1867.

---

IMPROVED BUGGY-SPRING.

---

The Schedule referred to in these Letters Patent and making part of the same.

---

TO ALL WHOM IT MAY CONCERN:

Be it known that I, WILLIAM HUMPHREYS, of Brooklyn, Kings county, New York, have invented a new and useful improvement in Buggy-Springs; and I do hereby declare that the following is a full, clear, and exact description thereof, which will enable others skilled in the art to make and use the same, reference being had to the accompanying drawings, forming part of this specification.

This invention consists in so constructing and attaching the springs of light wagons and buggies that the "perch" so generally used is dispensed with, whereby the middle of the rear axle is relieved of nearly all the weight usually put upon it, and the buggy is made much lighter in consequence thereof.

Figure 1 is a plan or top view of the springs attached to the axles of a buggy.

Figure 2 is a side view of the same.

Similar letters of reference indicate corresponding parts.

A represents the springs, which extend from the rear to the front axle. Each spring may be formed of two pieces jointed at the middle under the body, as seen at B. These springs are curved at the ends, as seen in the drawing, the rear ends being bent or curved so as to be nearly on a line parallel with the axle, when they are fastened to the axle by bolts or clips. It will be noticed that they are attached to the axle so that the weight in the body of the buggy bears upon the axle only at points which are near the hub of the wheel, thus relieving the middle of the rear axle of weight. C is the rear axle, and D is the front axle. E represents the bolsters, and F are the cross-bars to which the body is attached. The springs A are firmly secured to the bolsters E by bolts or clips, and they may be made each in one piece, but it is more convenient to make them in two, each as represented. The forward ends of the springs are curved in the form of a semicircle, and they are brought together and confined as represented. G is a cross-bar, which is attached to the springs near its ends, as seen at $a$, and to the ends of the springs, as seen at $b$, and also to the "D circle," marked $e$. $ff$ represent braces.

By this arrangement the perch and its attachments are entirely dispensed with, and by throwing the weight upon the ends of the rear axle I am enabled to make that axle, as well as the whole running gear of the vehicle, much lighter than it has hitherto been made. The springs A may be made of either wood or metal, as may be deemed most advisable by the manufacturer.

Having thus described my invention, what I claim as new, and desire to secure by Letters Patent, is—

The springs A, formed of either wood or metal, substantially as shown and described, and attached to the rear axle and to the "D circle," substantially as set forth and for the purposes specified.

The above specification of my invention signed by me this 7th day of May, 1867.

WILLIAM HUMPHREYS.

Witnesses:
WM. F. McNAMARA,
ALEX. F. ROBERTS.